United States Patent [19]

Shimp

[11] 4,279,007
[45] Jul. 14, 1981

[54] SINGLE-PHASE FAULT DETECTING CIRCUIT BREAKER

[75] Inventor: Alan B. Shimp, Monroeville, Pa.

[73] Assignee: Westinghouse Electric Corp., Pittsburgh, Pa.

[21] Appl. No.: 57,054

[22] Filed: Jul. 12, 1979

[51] Int. Cl.³ .............................................. H02H 3/16
[52] U.S. Cl. ....................................... 361/47; 361/93; 361/98
[58] Field of Search .................................... 361/93-98, 361/29, 42, 47, 48

[56] References Cited

U.S. PATENT DOCUMENTS

| | | | |
|---|---|---|---|
| 3,689,801 | 9/1972 | Engel et al. ............................. | 361/96 |
| 3,818,275 | 6/1974 | Shimp . | |
| 4,060,844 | 11/1977 | Davis et al. ......................... | 361/98 X |
| 4,121,269 | 10/1978 | Hobson, Jr. ......................... | 361/47 X |

*Primary Examiner*—Harry E. Moose, Jr.
*Attorney, Agent, or Firm*—M. J. Moran

[57] ABSTRACT

An electronic control system and associated circuit breaker is taught in which the effect of in-rush current on mining equipment, for example, in regard to tripping is minimized even though a single phase fault of an equal magnitude is adequately provided for. This is done even though the same circuit breaker system and circuit breaker for both situations is utilized. A resistive capacitive series network is utilized to separate the ripple frequency from the DC value of the overload current being sensed. If the ripple component is relatively high for a given amount of overload current in the lines to be protected, then that is indicative of a single-phase fault for which circuit breaker tripping should be provided. If on the other hand the same amount of current causes a ripple component of a relatively low value, that is indicative of balanced three-phased overload which is usually indicative of in-rush or spurious transients. In any case, higher values of overload will cause other portions of the circuit to trip for safety. A time delay is provided at the output of an operational amplifier interconnected with the series resistive capacitive circuit. The time delay provides further protection against spurious tripping. Furthermore, tuned feedback is provided for the operational amplifier to distinguish between the ripple frequency of a single-phase fault and the ripple frequency of a three-phase fault.

21 Claims, 2 Drawing Figures

SINGLE-PHASE FAULT DETECTING CIRCUIT BREAKER

BACKGROUND OF THE INVENTION

The subject matter of this invention relates generally to circuit breakers with fault detecting systems and more particularly to circuit breakers which can distinguish between three-phase and single-phase faults. Electronically controlled circuit breakers which are capable of being actuated on the occurrence of predetermined amount of fault current in the line to be protected are well known in the prior art. Such a circuit breaker is described in U.S. Pat. No. 3,818,275, issued June 18, 1974, to A. B. Shimp and assigned to the assignee of the present invention. Circuit breakers of this kind enjoy wide and diverse use in industry. Some of these circuit breakers are employed in the underground mining industry, for example. However, in the mining industry, mobile machinery, such as shuttle cars, continuous mining machines, etc., are electrically powered by way of trailing cables. Limits on the maximum allowable trip settings of the circuit breakers protecting these cables are specified by government regulations in many cases. Often the maximum allowable setting for a particular size cable is so low as to allow nuisance tripping of the circuit breaker when large motors on the mounting machines are started or stalled. It would be advantageous if circuit breaker systems could be devised in which the government's maximums could be adhered to without introducing undesirous nuisance tripping.

SUMMARY OF THE INVENTION

In accordance with the invention, electronically controlled circuit breaker apparatus is taught in which it is possible to discern between a three-phase fault, for example, and a single-phase fault. It has been determined empirically that most faults are single phase in nature in the mining industry, that is, the fault is either line-to-line or line-to-ground. On the other hand, motor-in-rush currents tend to be three phase in nature, that is, the in-rush is approximately equal for each phase. Consequently, the present invention discerns between a fault situation in which it is very desirable to actuate a circuit breaker operation and a current-in-rush situation or the like in which it is very desirable to delay or retard a circuit breaker operation. This is done by utilizing a circuit breaker control system which causes the circuit breaker to trip at a lower value for a single-phase fault than for a three-phase fault. The detection of the single-phase fault versus the three-phase fault is based upon rectifying and auctioneering the three-phase currents and sensing the resulting ripple current. Single-phase faults produce approximately six times as much ripple as comparable balance three-phase faults. By placing the series combination of a resistor and capacitor across the rating plug resistor of a circuit breaker such as the type described in the previously mentioned U.S. Pat. No. 3,818,275. Means is provided for determining whether the fault is a three-phase fault or a single-phase fault. The determination is based upon the amount of ripple. The DC voltage equivalent of the rectified current is generally impressed across the capacitive element while the ripple voltage equivalent component is generally impressed across the series connected resistive element. Consequently, even though the magnitude of the fault, whether it be three phase or single phase, may be the same. The ripple component impressed across the resistive element may be appreciably different. This ripple component is provided as an input to a differential amplifier which may also have a frequency sensitive feedback network associated therewith. It is well known that the single-phase ripple frequency is generally 120 Hz while three-phase ripple frequency is generally 360 Hz in a three-phase 60 Hz system. Consequently, if the feedback sensitive network has a breakpoint frequency which is between the single-phase ripple frequency of 120 Hz and the three-phase ripple frequency of 360 Hz further discrimination between single-phase faults and three-phase faults may be had. The output of the amplifier is provided by way of a time delay network to the tripping portion of the electronic circuit which controls the circuit breaker. The time delay network provides an even further means for protecting against in-rush nuisance tripping by delaying the tripping action for a relatively small period of time so that if the in-rush current decreases with time, as is likely to be the case, the tripping operation will be aborted.

BRIEF DESCRIPTION OF THE DRAWINGS

For better understanding of the invention, reference may be had to the preferred embodiments thereof shown in the accompanying drawings in which.

DESCRIPTION OF THE PREFERRED EMBODIMENTS

Figure 1:
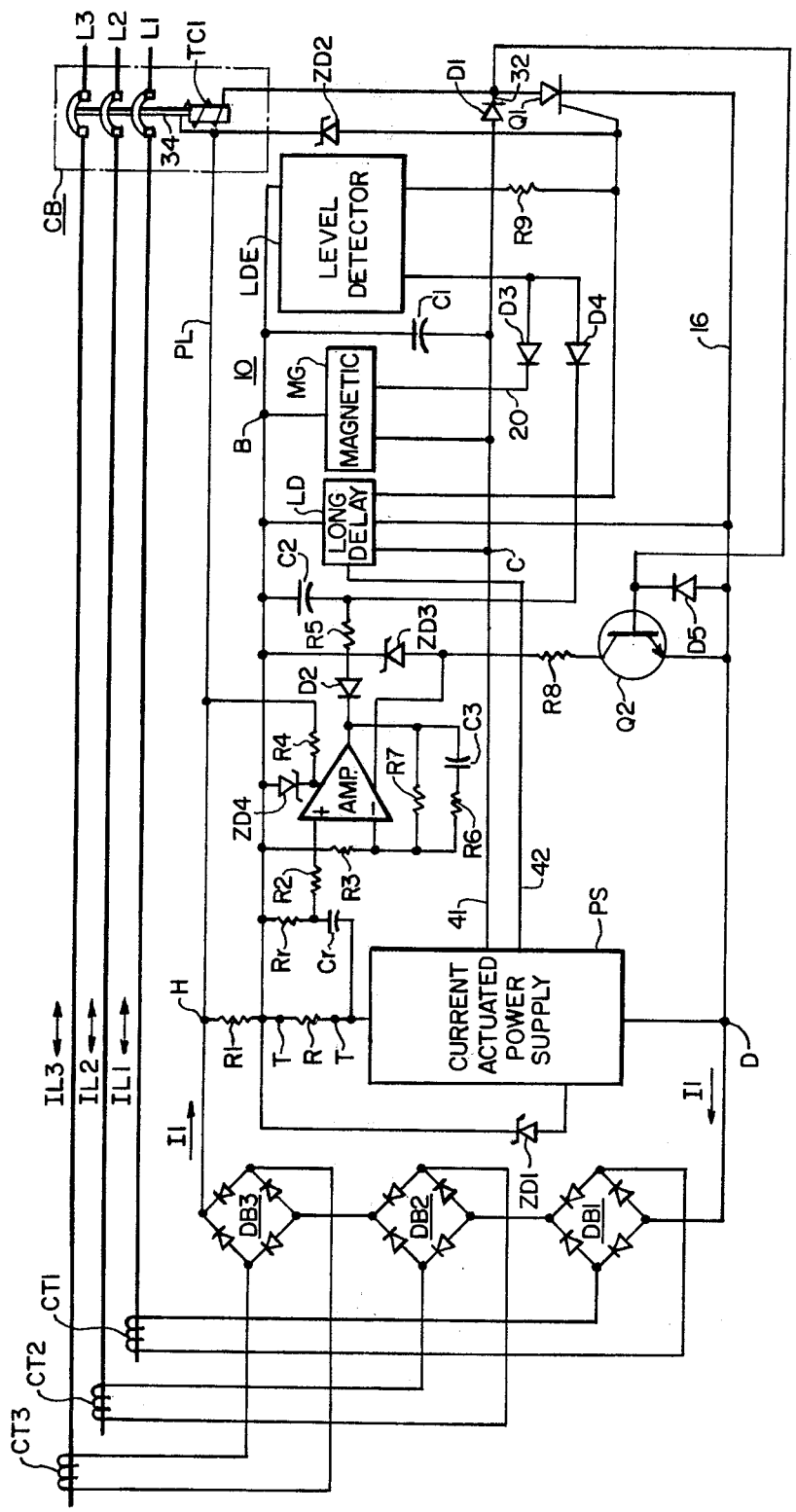
FIG. 1 shows the schematic circuit diagram of a three-phase circuit breaker and electronic control system in which either a single-phase fault or a three-phase fault may occur.

Referring now to the drawings, and FIG. 1 in particular, an electronically controlled fault sensing circuit breaker system 10 with the capability of distinguishing between single-phase and three-phase faults under certain circumstances is shown. Circuit breaker 10 is utilized to monitor and protect electrical lines L1, L2, and L3 in which may flow currents I1, I2, and I3, respectively. These currents are monitored by current transformers CT1, CT2, and CT3, respectively. Current transformer CT1 is interconnected with a full-wave diode bridge DB1, current transformer CT2 is interconnected with a full-wave diode bridge DB2, and current transformer CT3 is interconnected with a full-wave diode bridge DB3. The auctioneered outputs of the full-wave diode bridges, DB1 through DB3 are connected together in series circuit relationship and provide a two terminal output at H and D. The current provided by the diode bridge is designated I1. The lines L1, L2, and L3 are protected by a circuit breaker CB which includes three coordinated separable main contacts interconnected by way of a leakage mechanism 34 with a trip coil TC1. Terminal H is interconnected by way of line PL to one side of the trip coil TC1. The other side of the trip coil TC1 is connected concurrently to the anode of a silicon controlled rectifier or similar gating means Q1, the cathode of a diode D1 at line 32, the cathode of a diode D5, and the base of a transistor Q2. The other side or cathode of the silicon controlled rectifier Q1 is connected by way of line 16 with the previously described terminal D. Interconnected with the point H is a fixed resistive element R1. The other terminal of which is interconnected concurrently with one terminal T of a plug-in resistor R and the regulating terminal of a diode ZD1. The other terminal T of the plug-in resistive element R is connected to an input terminal for a current actuated power supply PS. Another terminal of the current actuated power supply PS is interconnected with the terminal D thus completing a series circuit between the current actuated power supply PS and the three diode bridges DB1 through DB3. Connected to the junction between the resistive element R1 and the resistive element R are the following:

One side of resistive element Rr
One side of resistive element R3
One side of a zener diode ZD4
One side of a zener diode ZD3
One side of a capacitive element C2
An input terminal for a long delay circuit LD
An input terminal for a magnetic circuit MG
One side of a capacitive element C1 and
One side of a level detector LDE.

The other side of the resistive element Rr is connected concurrently to one side of a resistive element R2 and to one side of a capacitive element Cr. The other side of the capacitive element Cr is connected to the other terminal of the resistive element R. The other side of the resistive element R2 is connected to the positive (+) input terminal of an amplifier AMP. The other side of the resistive element R3 is connected currently to the negative (−) input terminal of the previously mentioned amplifier AMP, to one side of a resistive element R6 and to one side of a resistive element R7. The other side of the resistive element R6 is connected to one side of a capacitive element C3, the other side of which is connected to the other side of the resistive element R7 and the output of the amplifier AMP. Also connected to the output of the amplifier AMP is the cathode of a diode D2, the anode of which is connected to one side of resistive element R5. The other side of the resistive element R5 is connected to the other side of the capacitive elements C2 and to the cathode of a diode D4. The anode of the diode D4 is connected as an input to the level detector LDE and the anode of diode D3, the cathode of which is interconnected to the output terminal 20 of the previously described magnetic circuit MG. One power supply output line 41 of the current actuated power supply PS is interconnected by way of terminal C to one input terminal of the long delay circuit LD, one input terminal of the magnetic circuit MG and the other side of the capacitive element C1. This latter point is connected to the anode of a diode D1, the cathode of which is connected to the previously described line 32. The zener diode ZD2 is connected at its regulating terminal to the line PL and at its anode to the gate of the transistor Q1. This latter point is interconnected with one side of a resistive element R9 and with an output of the long delay LD. The other side of the resistive element R9 is connected as an output of the level detector LDE. The emitter of the transistor Q2 is connected to the line 16 while the collector thereof is connected to one side of a resistive element R8, the other side of which is connected to the anode of the previously described zener diode ZD3, and to one power supply terminal of the previously described amplifier AMP. The other terminal or regulating terminal of the zener diode ZD4 is connected to another power supply terminal of the amplifier AMP and to one side of a resistive element R4, the other side of which is interconnected with line PL. An output 42 of the current actuated power supply PS is connected to an information terminal for the long delay circuit LD.

OPERATION

If the currents IL1 through IL3 of the lines L1 through L3, respectively, are of a normal nature, that is, not above the 100% rating of the circuit breaker ZB. The current transformers CT1 through CT3 will provide an auctioneering output by way of current I1 at the terminals H and D. This value of current will flow through the resistive element R1, the resistive element R2, and the current actuated power supply PS without causing actuation of any of the various actuating portions of the circuit 10. If any or all of the currents IL1 were to increase to an extremely high value, the voltage between the terminals H and D would become so large as to break down the zener diode ZD2 thus gating the silicon controlled rectifier Q1 on thus providing a path between terminals H and D which includes the trip coil TC1. This, of course, will cause near instantaneous tripping of the circuit breaker CB as would be desired in the aforementioned situation. If on the other hand, any of the currents IL1 through IL3 are of a very high nature, but not high enough as to cause instantaneous tripping of the circuit breaker CB, the voltage between the terminal B and the terminal C will be of such a high value as to actuate the magnetic circuit MG after a very small time delay period to energize the level detector LDE by way of line 20 and diode D3 to cause a gate signal to be applied by way of resistive element R9 to the gate of the silicon control rectifier Q1 thus causing actuation of the trip coil TC1 as described previously. The level detector LDE requires a minimum value of voltage at the line 20 for actuation to take place through resistive element R9. If the amount of line currents IL1 through IL3 or any one thereof is higher than rated current but still relatively lower than the current in the previously described situations, the long delay circuit LD will be actuated by way of terminals B, C, and 42 to cause an actuation of the trip coil TC1 and thus tripping of the circuit breaker CB by way of energization of the gate of the SCR Q1 at a time proportional to the inverse square of the highest value of current IL1 through IL3, the higher the current above rated value, the quicker the trip will take place. It is desirous to trip the circuit breaker CB if a bonified fault situation exists in any of the lines IL1 through IL3 but is not desired to prematurely trip the circuit breaker CB if the currents IL1 through IL3 merely represents a transient current or in-rush current such as may occur when a machine is initially energized. The remaining portion of the circuit 10 is utilized for this purpose. If the overload current is generally of the in-rush nature, the amount of overload current will be generally even or equal in each of the lines IL1, IL2, and IL3. However, if a bonified fault exists, it is likely that the fault will exist in an unbalanced sense in one of the lines L1, L2, L3 which said in another way means that one of the currents IL1, IL2, or IL3 may be substantially larger than the others. Said in still another way, this usually means that the fault is single-phase in nature. Regardless of which type of current is sensed, it produces a voltage across the previously described terminals TT of the resistive element R. The series combination of the resistive element Rr and capacitive element Cr essentially operates on the wave form of the previously described voltage so that the DC value thereof is dropped across the capacitive element Cr and the AC value thereof is impressed across the resistive element Rr. This latter voltage cooperates with terminal 41 of the current actuated power supply PS to charge the capacitive element C1 to the peak value of current detected in any short period of time. It is to be understood at this point that the present invention is not aimed at eliminating all spurious tripping situations but to statistically reduce the number of spurious tripping situations by attempting to discern between single-phase faults and multi-phase or three-phase faults. It can generally be presumed that if neither the magnetic circuit MG, long delay circuit LD or instantaneous circuit represented by the zener diode ZD2 are actuated that the remaining portion of the circuit will provide the tripping signal in an overload situation. If the peak value of voltage across the resistive element Rr is large, either because of a single-phase fault or a three-phase fault, the amplifier AMP will be actuated as will be described hereinafter to cause a tripping of the circuit breaker CB. If the ripple component impressed across the resistive element Rr is relatively low for a given range of fault current than that is indicative of a three-phase fault. If on the other hand, the AC component is relatively high for the same range, than that is indicative of a single-phase fault. Generally, an in-rush current will not produce an imbalance in current between the phases of sufficient magnitude to make the voltage across the resistive element Rr high enough to actuate the amplifier AMP. However, a single-phase fault of the same magnitude may well actuate the amplifier AMP because of its higher ripple voltage content. When the peak voltage between the plus (+) and minus (−) terminals of the amplifier AMP reaches a significantly high value, the operational amplifier AMP breaks down the diode D2 and by way of resistive element R5 and diode D4 begins actuation of the level detector LDE in a manner similar to that previously discussed. However, the operation will be delayed slightly by the operation of the capacitive element C2. Furthermore, if the output signal from the operational amplifier is in the order of 360 Hz which is related to three-phase ripple which in turn represents an in-rush current, the tuned relationship associated with the resistive elements R6, R7 and the capacitive element C3 will operate on the output of the amplifier in such a manner that the output tends to be decreased with all other things being equal. If on the other hand the frequency of the output voltage of the amplifier AMP is of value of approximately 120 Hz indicative of a single-phase fault, the tuned relationship between the resistive elements R6, R7 and capacitive elements C3 is such that the signal at the output of the amplifier AMP tends to increase everything else being equal. Of course, the latter situation represents an undesirable fault which should be utilized to energize the trip coil TC1 whereas the former situation does not. Consequently, it can be seen that a number of important functions are provided by the circuits surrounding the amplifier AMP. First, a single-phase fault of a given magnitude tends to cause the circuit breaker CB to trip, whereas a three-phase fault of the same magnitude tends not to. This is desired in the present case. The affect of in-rush is compensated for slightly by the presence of the capacitive element C2 which introduces a delay in the output of the amplifier AMP which in turn gives an opportunity for natural correction. The tuned relationship of the resistive elements R6, R7 and the capacitive element C3 tends to enhance tripping for a single-phase fault and retard tripping for a three-phase fault of generally the same magnitude. The power supply terminal of the amplifier AMP associated with the resistive element R8 of the zener diode ZD3 is such that the amplifier is in an actuated state if the thyristor Q1 is non-actuated. When it becomes actuated, however, the voltage thereacross drops to a sufficiently low level as to turn off the transistor element Q2 thus removing the source of power supply from the amplifier AMP thus deactuating the amplifier AMP. This means that after a trip situation has been determined to exist all of the power provied by the diode bridges DB1 through DB3 is routed by way of line PL to increase the capability for tripping the circuit breaker CB.

Figure 2:
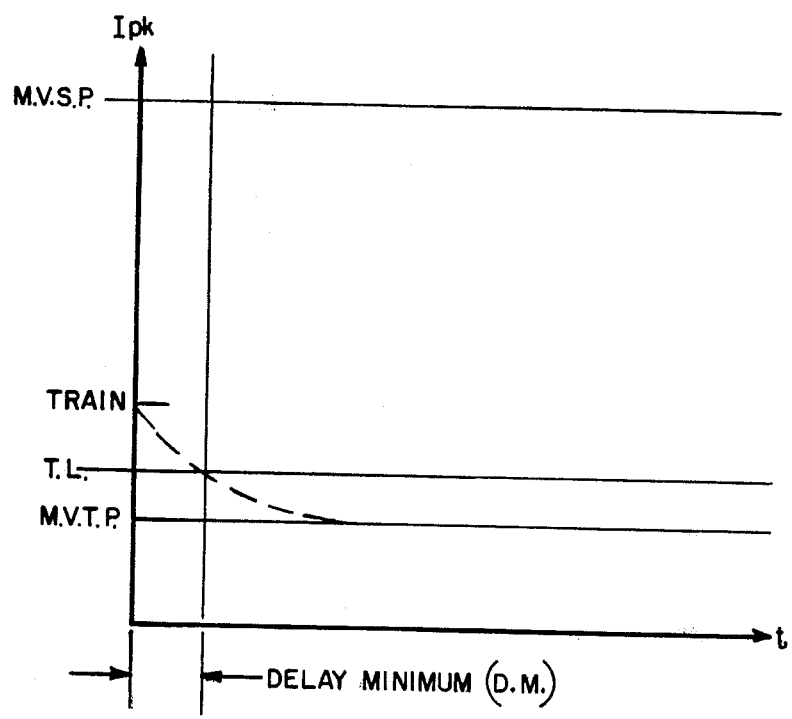
FIG. 2 shows a comparison of various current curves for a given trip level for the apparatus of FIG. 1.

FIG. 2 shows a trip level TL for circuit breaker CB can be chosen so that the maximum value of three-phase fault current M.V.T.P. will not exceed it and thus not cause tripping. On the other hand all values of single-phase fault current between the values TL and M.V.S.P. will cause tripping as is desired. The wave form for in-rush transient current TRAIN shows that an appropriate delay DM can be utilized.

It is to be understood with respect to the embodiments of this invention that the concepts may be utilized for other than three-phase operations if that is desired. It is also to be understood that the presence of the magnetic circuit, long delay circuit, or the instantaneous circuit associated with the zener diode D1 is not required either totally or in part for the operation of the present invention to be effective. It is also to be understood that the various polarities of the static devices are not limiting providing that the circuit elements are consistently oriented for effective operation when necessary.

The apparatus taught with respect to the embodiments of this invention has many advantages. One advantage lies in the fact that the effect of in-rush current in mining equipment, for example, on the circuit breakers thereof can be minimized without effecting the operation associated with single-phase faults. Another advantage lies in the fact that a time delay element is provided which delays tripping on in-rush current. Still another advantage lies in the fact that a feedback network for an operational amplifier is tuned so that the breakpoint for the operational amplifier lies between the single-phase ripple current frequency at which tripping is desired and the multi-phase ripple frequency at which tripping is not desired.

What I claim as my invention is:

1. Apparatus for determining in a three-phase alternating current electrical system whether fault current which flows therein when the peak value thereof is within a range of peak values of fault currents is either three-phase or single-phase in nature, comprising:

(a) fault sensing means interconnected with said elecrical system for providing an output voltage signal the peak absolute value of which is related to said peak value of fault current, said voltage output signal having an AC voltage component, the peak value of said AC voltage component being no larger than a predetermined value for the maximum possible three-phase AC fault current component which is available when said peak value of fault current is within said range, but said peak value of said AC voltage component being larger than said predetermined value for the maximum possible single-phase AC fault current component which is available when said peak value of fault is within said range;

(b) filter means connected in circuit relationship with said fault sensing means in such a manner as to have said output voltage signal impressed thereacross, said filter means having a portion thereof across which only said AC voltage component appears; and (c) indicator means the input of which is connected across said portion for being sensitive only to said AC component of said voltage signal, the minimum value of said AC component of said voltage signal for which said indicator means provides an output being larger than said predetermined value so that an output may be had for a single-phase AC fault current component but not for the maximum three-phase AC fault current component.

2. The combination as claimed in claim 1 wherein said indicator means includes frequency dependent feedback means, said frequency dependent feedback means having a tendency to reduce the effect of a three-phase AC fault current component relative to the effect of a single-phase AC fault current component.

3. The combination as claimed in claim 1 wherein time delay means is provided to delay the effect of a three-phase AC fault current component or a single-phase AC fault current component to thus give either component an opportunity to subside.

4. The combination as claimed in claim 1 wherein said filter means comprises serially connected resistor means and capacitor means connected across the output of said fault sensing means, said portion comprising said resistor means.

5. Apparatus for determining in a three-phase alternating current electrical system whether fault current which flows therein when the peak value thereof is within a range of peak values of fault currents is either three phase or single phase in nature, comprising:

(a) fault sensing means interconnected with said electrical system for providing an output voltage signal the value of which is related to said peak value of fault current, said voltage output signal having an AC voltage component, the frequency of said AC voltage component being no lower than a predetermined value for the maximum possible three-phase AC fault current component which is available when said peak value of fault current is within said range, but said frequency of said AC voltage component being lower than said predetermined value for the maximum possible single-phase AC fault current component which is available when said peak value of fault current is within said range;

(b) filter means connected in circuit relationship with said fault sensing means in such a manner as to have said output voltage signal impressed thereacross, said filter means having a portion thereof across which only said AC voltage component appears; and (c) indicator means the input of which is connected across said portion for being sensitive only to said AC component of said voltage signal, the maximum frequency value of said AC component of said voltage signal for which said indicator means provides an output being lower than said predetermined value so that an output may be had for a single-phase AC fault current component but not for the maximum three-phase AC fault current component.

6. The combination as claimed in claim 5 wherein time delay means is provided to delay the effect of a three-phase AC fault current component or a single-phase AC fault current component to thus give either component an opportunity to subside.

7. The combination as claimed in claim 5 wherein said filter means comprises serially connected resistor means and capacitor means connected across the output of said fault sensing means, said portion comprising said resistor means.

8. Apparatus for determining in a multi-phase alternating current electrical system whether fault current which flows therein when the peak value thereof is within a range of peak values of fault currents is either multi-phase or single phase in nature, comprising:

(a) fault sensing means interconnected with said electrical system for providing an output voltage signal the peak absolute value of which is related to said peak value of fault current, said voltage output signal having an AC voltage component, the peak value of said AC voltage component being no larger than a predetermined value for the maximum possible multi-phase AC fault current component which is available when said peak value of fault current is within said range, but said peak value of said AC voltage component being larger than said predetermined value for the maximum possible single-phase AC fault current component which is available when said peak value of fault current is within said range;

(b) filter means connected in circuit relationship with said fault sensing means in such a manner as to have said output voltage signal impressed thereacross, said filter means having a portion thereof across which only said AC voltage component appears; and (c) indicator means the input of which is connnected across said portion for being sensitive only to said AC component of said voltage signal, the minimum value of said AC component of said voltage signal for which said indicator means provides an output being larger than said predetermined value so that an output may be had for a single-phase AC fault current component but not for the maximum multi-phase AC fault current component.

9. The combination as claimed in claim 8 wherein said indicator means includes frequency dependent feedback means, said frequency dependent feedback means having a tendency to reduce the effect of a multi-phase AC fault current component relative to the effect of a single phase AC fault current component.

10. The combination as claimed in claim 8 wherein time delay means is provided to delay the effect of a multi-phase AC fault current component or a single phase AC fault current component to thus give either component an opportunity to subside.

11. The combination as claimed in claim 8 wherein said filter means comprises serially connected resistor means and capacitor means connected across the output of said fault sensing means, said portion comprising said resistor means.

12. Apparatus for determining in a multi-phase alternating current electrical system whether fault current which flows therein when the peak value thereof is within a range of peak values of fault currents is either multi-phase or single phase in nature, comprising:

(a) fault sensing means interconnected with said electrical system for providing an output voltage signal the value of which is related to said peak value of fault current, said voltage output signal having an AC voltage component, the frequency of said AC voltage component being no lower than a predetermined value for the maximum possible multi-phase AC fault current component which is available when said peak value of fault current is within said range, but said frequency of said AC voltage component being lower than said predetermined value for the maximum possible single-phase AC fault current component which is available when said peak value of fault current is within said range;

(b) filter means connected in circuit relationship with said fault sensing means in such a manner as to have said output voltage signal impressed thereacross, said filter means having a portion thereof across which only said AC voltage component appears; and (c) indicator means the input of which is connected across said portion for being sensitive only to said AC component of said voltage signal, the maximum frequency value of said AC component of said voltage signal for which said indicator means provides an output being lower than said predetermined value so that an output may be had for a single-phase AC fault current component but not for the maximum multi-phase AC fault current component.

13. The combination as claimed in claim 12 wherein time delay means is provided to delay the effect of a multi-phase AC fault current component or a single phase AC fault current component to thus give either component an opportunity to subside.

14. The combination as claimed in claim 12 wherein said filter means comprises serially connected resistor means and capacitor means connected across the output of said fault sensing means, said portion comprising said resistor means.

15. Circuit interrupter apparatus including apparatus for determining in a three-phase alternating current electrical system which is protected thereby whether fault current which flows therein when the peak value thereof is within a range of peak values of fault currents is either three phase or single phase in nature so that tripping may occur only on an appropriate single phase fault, comprising:

(a) fault sensing means interconnected with said electrical system for providing an output voltage signal the peak absolute value of which is related to said peak value of fault current, said voltage output signal having an AC voltage component, the peak value of said AC voltage component being no larger than a predetermined value for the maximum possible three-phase AC fault current component which is available when said peak value of fault current is within said range, but said peak value of said AC voltage component being larger than said predetermined value for the maximum possible single-phase AC fault current component which is available when said peak value of fault current is within said range;

(b) filter means connected in circuit relationship with said fault sensing means in such a manner as to have said output voltage signal impressed thereacross, said filter means having a portion thereof across which only said AC voltage component appears;

(c) indicator means the input of which is connected across said portion for being sensitive only to said AC component of said voltage signal, the minimum value of said AC component of said voltage signal for which tripping is to occur being larger than said predetermined value so that tripping may occur for a single phase AC fault current component but not for the maximum three-phase AC fault current component; and (d) separable main contact means interconnected with said three-phase electrical system for being controlled by the action of said indicator means.

16. The combination as claimed in claim 15 wherein said indicator means includes frequency dependent feedback means, said frequency dependent feedback means having a tendency to reduce the effect of a three-phase AC fault current component relative to the effect of a single phase AC fault current component.

17. The combination as claimed in claim 15 wherein time delay means is provided to delay the effect of a three-phase AC fault current component or a single phase AC fault current component to thus give either component an opportunity to subside.

18. The combination as claimed in claim 15 wherein said filter means comprises serially connected resistor means and capacitor means connected across the output of said fault sensing means, said portion comprising said resistor means.

19. Circuit interrupter apparatus including apparatus for determining in a three-phase alternating current electrical system which is protected thereby whether fault current which flows therein when the peak value thereof is within a range of peak values of fault currents is either three phase or single phase in nature so that tripping may occur only on an appropriate single phase fault, comprising:

(a) fault sensing means interconnected with said electrical system for providing an output voltage signal the value of which is related to said peak value of fault current, said voltage output signal having an AC voltage component, the frequency of said AC voltage component being no lower than a predetermined value for the maximum possible three-phase AC fault current component which is available when said peak value of fault current is within said range, but said frequency of said AC voltage component being lower than said predetermined value for the maximum possible single-phase AC fault current component which is available when said peak value of fault current is within said range;

(b) filter means connected in circuit relationship with said fault sensing means in such a manner as to have said output voltage signal impressed thereacross, said filter means having a portion thereof across which only said AC voltage component appears; and (c) indicator means the input of which is connected across said portion for being sensitive only to said AC component of said voltage signal, the maximum frequency value of said AC component of said voltage signal for which tripping is to occur being lower than said predetermined value so that tripping may occur for a single-phase AC fault current component but not for the maximum three-phase AC fault current component; and (d) separable main contact means interconnected with said three-phase electrical system for being controlled by the action of said indicator means.

20. The combination as claimed in claim 19 wherein time delay means is provided to delay the effect of a three-phase AC fault current component or a single phase AC fault current component to thus give either component an opportunity to subside.

21. The combination as claimed in claim 19 wherein said filter means comprises serially connected resistor means and capacitor means connected across the output of said fault sensing means, said portion comprising said resistor means.

* * * * *